Sept. 10, 1935.  D. T. BROCK  2,014,309
UNIVERSAL JOINT AND COUPLING
Filed Dec. 21, 1932  2 Sheets-Sheet 1
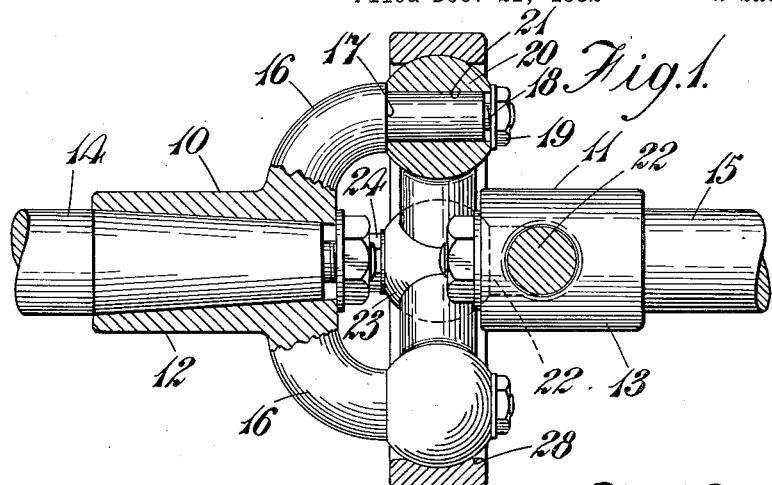
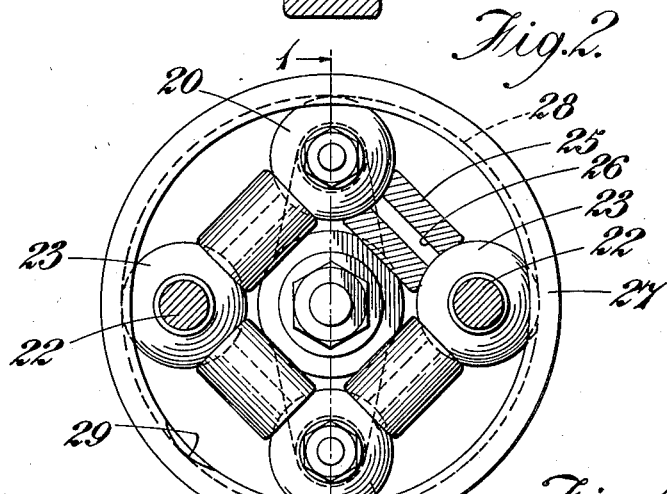
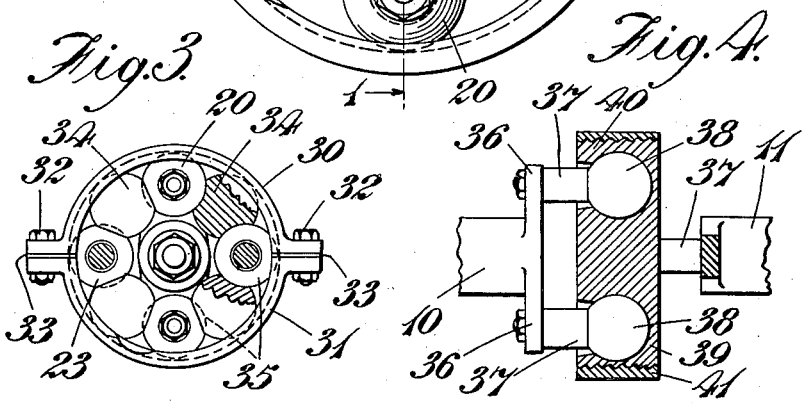
Inventor
D. T. Brock Sept. 10, 1935.  D. T. BROCK  2,014,309
UNIVERSAL JOINT AND COUPLING
Filed Dec. 21, 1932   2 Sheets-Sheet 2
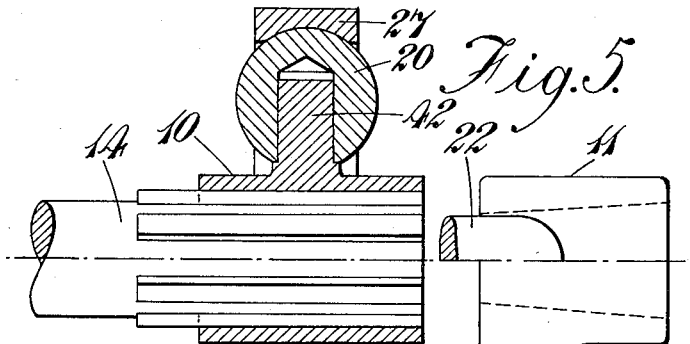
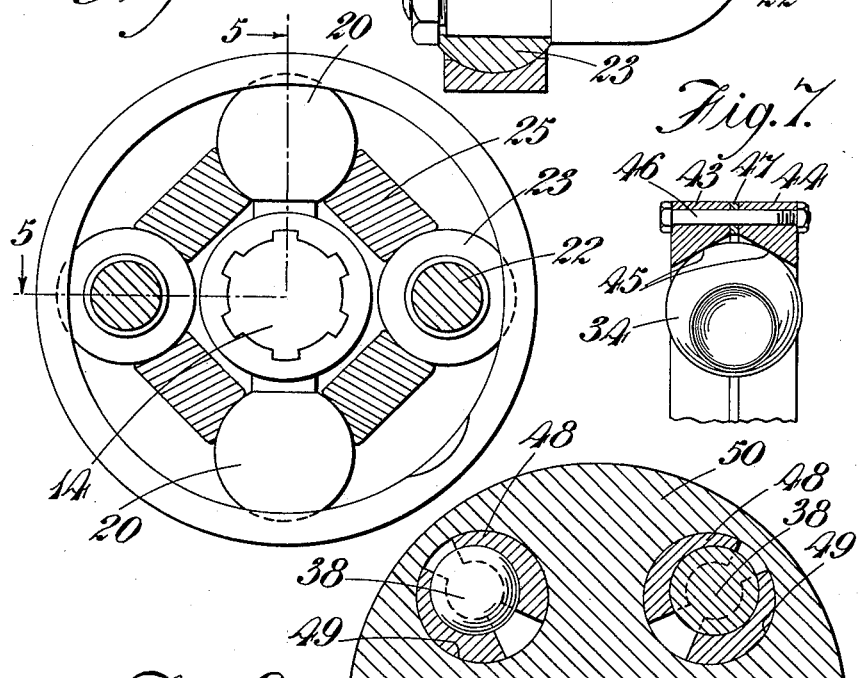
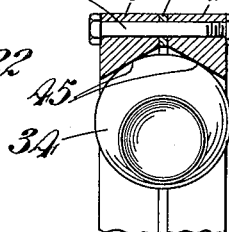
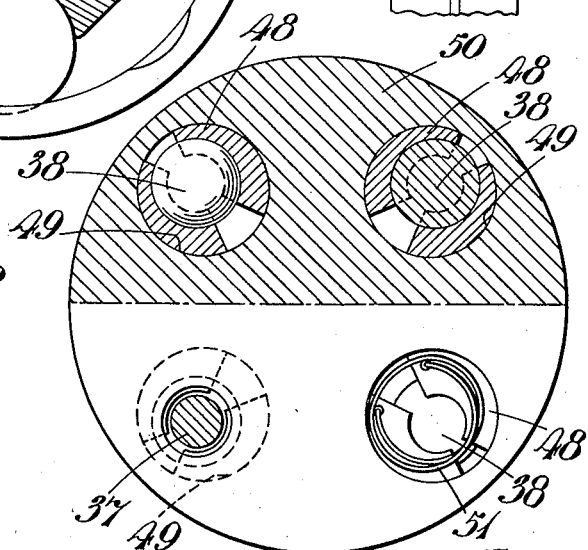

Patented Sept. 10, 1935

2,014,309

UNITED STATES PATENT OFFICE 2,014,309

UNIVERSAL JOINT AND COUPLING

Denis Tabor Brock, London, England, assignor, by mesne assignments, to Automotive Products Company Limited, London, England Application December 21, 1932, Serial No. 648,269
In Great Britain April 16, 1932

5 Claims. (Cl. 64—102)

This invention relates to universal joints and couplings, and it has for its primary object to provide a form and construction of universal joint which is very efficient and quiet in operation, and which is comparatively simple in construction.

In the known forms of universal joint, pivot pins are usually employed for operatively connecting an intermediate member with a driven and driving member, and any slackness due to wear cannot be taken up except by the costly method of replacing the worn parts. These difficulties may be readily overcome in the device according to the invention, by the provision of adjustment means which may be arranged to compensate for wear automatically or otherwise.

According to the present invention there is provided a universal joint or coupling comprising a driven and a driving member, said members being operatively connected together through the medium of ball and socket joints, the centres of which are displaced radially with regard to the axes of the driving and driven members. A further feature consists in the provision of a coupling having an intermediate member arranged for the transmission of rotational movement from the driven member to the driving member, the torque being transmitted to or from the intermediate member by means of ball and socket joints disposed so that their centres are displaced from the axes of rotation of the driven and driving members. The ball and socket joints connecting operatively the driven and driving members may conveniently be co-planar, and they may be surrounded by an annular member which prevents spreading movement of the ball and socket joints when transmitting power. Such annular member is preferably provided with means whereby its diameter may be modified by effecting the adjustment of the ball and socket joints. The driven and driving members may be provided with projections which terminate in the form of partial or complete spheres, each forming part of the corresponding ball and socket joint, and, if desired, said spheres may be formed separately from the projections and may be bored eccentrically so as to provide a limited amount of adjustment according to their angular position with regard to the pins or equivalent by which they are attached to the corresponding projections. The intermediate member or equivalent device through which the drive is transmitted may comprise a block of material in which balls attached to the driven and driving members are embedded, an outer reinforcing ring being provided if desired. Alternatively, the intermediate member may consist of a plurality of compression blocks disposed between adjacent balls of the driven and driving members, respectively, and forming an operative connection between said balls, the blocks conveniently being in the form of cylinders having spherically recessed ends which bear against the surface of the balls.

The invention is illustrated in the accompanying diagrammatic drawings, in which:

Figure 1 is a part longitudinal sectional elevation through one form of universal joint taken on the line 1—1 of Figure 2;

Figure 2 is a part sectional end elevation;

Figure 3 shows a modified form of universal joint in part sectional end elevation;

Figure 4 is a sectional side elevation of a further modified form;

Figures 5 and 6 show another modification, Figure 5 being a part section on the line 5—5 of Figure 6, and Figure 6 being a part sectional end elevation;

Figure 7 is a diagram illustrating a modified method of adjustment, and

Figure 8 is a part sectional end elevation of a modified form of intermediate member.

Throughout the specification the universal joint or coupling will be treated as a unit, and that part which receives the torque will be known as the driven member, while the part by which said torque is transferred to the load will be referred to as the driving member.

Thus, referring to Figures 1 and 2, it will be seen that a driven member 10 and a driving member 11 each consists of a collar 12 and 13, respectively, which are bored to fit a driving shaft 14 and a driven or load shaft 15, respectively. The collar 12 is formed with a pair of curved projections 16 which are shouldered at 17 and are screwthreaded at their ends 18 for the accommodation of a nut 19 by which a sphere 20 is firmly held in position. The internal bore 21 of the sphere is preferably slightly eccentric with regard to the periphery so as to permit a certain amount of adjustment to be made. The collar 13 is also formed with similar arms which are indicated at 22, these being arranged to support a pair of spheres 23 by means of nuts 24 in the same manner.

By referring to Figure 2, it will be seen that the driven balls 20 and the driving balls 23 are alternately arranged, and are maintained in spaced relationship by means of compression members 25 which take the form of cylindrical blocks provided with an axial passage 26 for retaining lubricant, and shaped at their ends so as to conform to the surfaces of the balls 20 and 23. These compression blocks together form the intermediate member between the driven and driving members. This arrangement allows freedom of movement in two planes at right-angles so that the device can function as the universal joint. When, however, torque is being transmitted, there is a tendency for the balls 20 and 23 to be splayed outwardly, and for preventing this, an annular member 27 is formed with a groove 28 of segmental cross-section into which the balls 20 and 23 are admitted by the provision of a cut-away portion 29.

The annular member may conveniently serve as a means whereby the freedom of movement of the various parts may be adjusted, and in Figure 3 said member comprises two semi-circular portions 30 and 31 which are held together by means of bolts 32 and are adjustable within limits by varying the thickness of shims 33. In this case, the compression blocks take the form of balls 34 which are preferably very slightly larger in diameter than the balls 20 and 23, said balls 34 being shaped with spherical recesses 35 which form bearing surfaces co-operating with the balls 20 and 23.

A simplified form of universal joint is shown in Figure 4 in which the driven member 10 is provided with a pair of laterally extending lugs 36, each of which carries a projection 37 formed upon its extremity with a sphere 38. The driving member 11 which, of course, is oppositely disposed is also of similar formation, and the balls 38 are embedded in an intermediate member consisting of a block 39 which may conveniently be composed of material, such as white metal or moulded synthetic resin, clearance spaces 40 serving to allow the necessary rocking movement of the projections 37. The block 39 is reinforced by means of an outer ring 41.

If desired, the arrangement shown in Figures 1 and 2 may be substantially simplified as shown in Figures 5 and 6, and in this case the driven member 10 is formed with a pair of radially extending pins as indicated at 42, upon which the driven balls 20 are disposed and are held in place by means of the annular member 27. The member 10 may be splined upon the shaft 14 and may, if desired, be arranged for sliding movement thereupon. The driving member 11 is of substantially the same construction, being provided with curved arms 22 which carry a pair of driving balls 23, said balls being spaced apart by means of compression blocks 25 which may be solid or hollow as desired.

It will be understood that various means may be employed for varying the diameter of the outer ring 27 or equivalent annular member, and in Figure 7 an arrangement is shown in which said member comprises two portions 43 and 44 each having a conical surface 45, while a number of bolts, such as that indicated at 46, serve to hold the rings 43 and 44 together with a shim 47 between them, thus providing a two-point bearing for each of the compression blocks 34.

The universal joints according to the invention may be lubricated in any convenient manner, such as from the central lubrication system of a motor vehicle, or alternatively an outer casing may be provided which is filled with lubricant, suitable ducts or channels being provided whereby such lubricant may be fed to the bearing surfaces. In the case of the white metal bearings such ducts or channels are preferably drilled after the casting operation, while, if desired, such ducts may be formed in the driven and/or the driving balls.

Moreover, means may be provided whereby the ball and socket joints may be arranged so that clearance is taken up automatically and one form of such a joint is shown diagrammatically in Figure 8, in which the general form is similar to that in Figure 4. Each of the spheres 38 is accommodated between a pair of seating members 48 carried in a circular housing 49 formed in the intermediate member 50. The seating members 48 act as wedges due to the eccentricity of the sphere 38 with the housing 49, and they are influenced by means of a spring 51 so that their thinner ends tend to move together, thus taking up all play.

It will be understood that the invention is not limited to the constructions herein described and the details may be modified to suit requirements. Thus, an outer casing, if desired provided with sliding spherical or curved overlapping surfaces, may be arranged to prevent the access of dirt and grit to the bearing and other surfaces of the universal joint, while in cases where the space between the balls is occupied by bearing metal or moulded material, compression blocks may also be incorporated or thin metal casings may be provided outside the balls for taking the rubbing action.

What I claim is:—

1. A universal joint comprising a driving and a driven member, a pair of arms formed upon each of said members, balls formed one upon each of the arms, the balls on the driving and driven members respectively being alternately arranged to form a circumferential series, a plurality of thrust members each shaped to fit between consecutive balls and forming a substantially solid strut for transmitting torque from one ball on the driving member to the next adjacent ball on the driven member, and an outer ring formed separately from the compression members but in contact with the balls for preventing outward splaying movement of the arms.

2. A universal joint comprising driving and driven members, a pair of arms upon each of said members, a ball on each of the arms, an outer ring and a plurality of thrust members, said driving and driven members being arranged in opposition, with the corresponding balls alternately spaced in a circumferential series and retained against outward splaying movement by direct contact with the outer ring, said balls being spaced circumferentially by the thrust members which are hollowed where they coact with the balls.

3. A universal joint comprising a driven member, a driving member, an intermediate member connecting said driven and driving members, a plurality of ball and socket joints interposed with their centers displaced radially from the axes of the driving and driven members to transmit torque between the intermediate driven and driving members, the ball and socket joints including ball elements, and a plurality of compression blocks forming an operative connection between said ball elements.

4. A universal joint comprising a driven member, a driving member, an intermediate member connecting said driven and driving members, a plurality of ball and socket joints interposed with their centers displaced radially from the axes of the driving and driven members to transmit torque between the intermediate driven and driving members, the ball and socket joints including ball elements, and a plurality of compression blocks forming an operative connection between said ball elements, the compression blocks being in the form of cylinders having spherically recessed ends which bear against the surface of the balls.

5. A universal joint comprising driving and driven members, a pair of arms upon each of said members, a ball on each of the arms, locking means securing the balls to the arms, an outer ring, and a plurality of thrust members, the driving and driven members being arranged in opposition, with the corresponding balls alternately spaced in a circumferential series and retained against outward splaying movement by the outer ring, said balls being spaced circumferentially by the thrust members and bored eccentrically so as to permit adjustment of the balls toward and away from the outer ring.

DENIS TABOR BROCK.